United States Patent
Matsuda et al.

(10) Patent No.: US 9,344,347 B2
(45) Date of Patent: May 17, 2016

(54) DELAY TIME MEASURING APPARATUS, COMPUTER READABLE RECORD MEDIUM ON WHICH DELAY TIME MEASURING PROGRAM IS RECORDED, AND DELAY TIME MEASURING METHOD

(75) Inventors: Yuichi Matsuda, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 933 days.

(21) Appl. No.: 12/410,138

(22) Filed: Mar. 24, 2009

(65) Prior Publication Data
US 2009/0310500 A1 Dec. 17, 2009

(30) Foreign Application Priority Data
Jun. 17, 2008 (JP) .................................. 2008-157393

(51) Int. Cl.
H04L 12/26 (2006.01)
(52) U.S. Cl.
CPC ........... *H04L 43/0864* (2013.01); *H04L 43/106* (2013.01)
(58) Field of Classification Search
None
See application file for complete search history.

(56) References Cited

U.S. PATENT DOCUMENTS

| | | | | |
|---|---|---|---|---|
| 5,036,518 A * | 7/1991 | Tseung | ................. | H04L 1/1854 370/432 |
| 7,574,726 B2 * | 8/2009 | Zhang | ................... | H04L 47/263 370/252 |
| 2002/0174216 A1 * | 11/2002 | Shorey et al. | ................. | 709/224 |
| 2007/0041335 A1 * | 2/2007 | Znamova | ............ | H04L 12/2602 370/254 |
| 2008/0037420 A1 * | 2/2008 | Tang | .............................. | 370/229 |
| 2008/0062875 A1 * | 3/2008 | Yamazaki et al. | ............. | 370/232 |
| 2008/0168177 A1 * | 7/2008 | Subramaniam | ................ | 709/231 |
| 2008/0181109 A1 * | 7/2008 | Igarashi et al. | ................ | 370/231 |
| 2011/0075582 A1 * | 3/2011 | Sugiyama | ........... | H04L 41/5035 370/252 |
| 2015/0023189 A1 * | 1/2015 | Okada | ................... | H04W 24/08 370/252 |

FOREIGN PATENT DOCUMENTS

| | | |
|---|---|---|
| JP | A 2000-106557 | 4/2000 |
| JP | A 2001-111618 | 4/2001 |
| JP | A 2001-237833 | 8/2001 |
| JP | 2002-374301 | 12/2002 |

(Continued)

OTHER PUBLICATIONS

Japanese Office Action issued in corresponding Japanese App. No. 2008-157393, issued Feb. 14, 2012.

*Primary Examiner* — Marsha D Banks Harold
*Assistant Examiner* — Christopher Wyllie
(74) *Attorney, Agent, or Firm* — Greer Burns & Crain Ltd.

(57) ABSTRACT

In a delay time measuring apparatus a sequence number, data length, and receiving time of a data packet transmitted from a source unit to a destination unit are stored in a storage section. In addition, an ACK number and receiving time of an ACK packet returned from the destination unit to the source unit are stored in the storage section. After that, a calculation section obtains an ACK packet an ACK number of which is equal to a value obtained by adding data length of a second data packet of two successive data packets transmitted without waiting for the ACK packet to a sequence number of the second data packet of the two successive data packets from the storage section. Then the calculation section calculates round trip time from receiving time of the second data packet of the two successive data packets and receiving time of the ACK packet obtained.

7 Claims, 18 Drawing Sheets

(56) References Cited

FOREIGN PATENT DOCUMENTS

| JP | A 2002-374301 | 12/2002 |
|----|---------------|---------|
| JP | A 2003-124985 | 4/2003  |
| JP | A 2004-23794  | 1/2004  |
| JP | 2004-072372   | 3/2004  |
| JP | 2004-221801   | 8/2004  |
| JP | A 2005-110038 | 4/2005  |

* cited by examiner

124a TCP SESSION TABLE

| TCP SESSION ID | SOURCE IP ADDRESS (SA) | FIRST DATA PACKET INFORMATION (DP1) | | | SECOND DATA PACKET INFORMATION (DP2) | | | ... | PRECEDING ACK |
|---|---|---|---|---|---|---|---|---|---|
| | | Time | Seq | Len | Time | Seq | Len | | |
| A | 10.20.30.45 | T1 | 200 | 10 | T2 | 210 | 10 | | 200 |
| A | 10.10.10.11 | T3 | 9000 | 1460 | | | | | 9000 |
| B | ... | | | | | | | | ... |

FIG. 8

DELAY TIME MEASURING APPARATUS, COMPUTER READABLE RECORD MEDIUM ON WHICH DELAY TIME MEASURING PROGRAM IS RECORDED, AND DELAY TIME MEASURING METHOD

CROSS-REFERENCE TO RELATED APPLICATIONS

This application is based upon and claims the benefit of priority of the prior Japanese Patent Application No. 2008-157393, filed on Jun. 17, 2008, the entire contents of which are incorporated herein by reference.

FIELD

The embodiments discussed herein are related to a delay time measuring apparatus and a delay time measuring method for measuring round trip time from the time of data being transmitted to the time of a confirmation response being received and a computer readable record medium on which a delay time measuring program for measuring round trip time from the time of data being transmitted to the time of a confirmation response being received is recorded.

BACKGROUND

With some protocols used for data communication via a network, a confirmation response is returned from a unit which receives data. TCP/IP (transmission control protocol/internet protocol) is among such communication protocols. With TCP/IP, a network layer protocol is IP and a transport layer protocol is TCP or UDP (user datagram protocol). If TCP is used as a transport layer protocol, a confirmation response to received data is made. With TCP reliable communication is realized by necessarily transmitting a confirmation response to a packet transmitted.

FIG. 18 illustrates an example basic operation of transmitting and receiving a packet on the basis of TCP. In this example, a confirmation response to data transmitted from a source host 911 is returned from a destination host 912.

First, the source host 911 generates a TCP packet including the data to be transmitted (by adding a TCP header to the data to be transmitted), generates an IP packet including the TCP packet, and transmits the IP packet to the destination host 912. The destination host 912 which receives the IP packet takes the TCP packet out of the IP packet and takes the data out of the TCP packet. At this time the destination host 912 passes the data taken out of the TCP packet to an upper application and automatically returns a confirmation response to the source host 911. The confirmation response is automatically returned in the TCP protocol stack regardless of instructions from the upper application.

With TCP this confirmation response is referred to as an "acknowledge" (hereinafter abbreviated as an ACK). The destination host 912 which receives the TCP packet returns an ACK in order to indicate that the data is received. When the source host 911 receives the ACK, the source host 911 recognizes that the data transmission is completed, and proceeds to next operation. If the source host 911 cannot receive an ACK after a short wait, then the source host 911 considers that the transmission has failed, and performs the operation of retransmitting the data.

When data is transmitted, an ACK is returned in this way. Accordingly, round trip time (RTT) for the data can be measured by monitoring packets used for transmitting the data and the ACK on a network on the basis of TCP. That is to say, the data is transmitted, and the ACK is returned to indicate that the data is received. Therefore, RTT is a period from the time of the data being transmitted to the time of the ACK being received. For example, the quality of the network can be grasped by measuring the RTT.

With the basic operation depicted in FIG. 18, the source host 911 performs next data transmission after receiving the ACK of the transmitted data returned from the destination host 912. That is to say, there is a data transmission interval. As a result, data transmission efficiency falls. Accordingly, the source host 911 performs data transmission continuously without waiting for the ACK. The size of data which the source host 911 can transmit without waiting for the ACK is referred to as window size. The destination host 912 informs the source host 911 of window size by which the source host 911 transmits data to the destination host 912.

If the destination host 912 which receives data returns an ACK instantly, the destination host 912 may designate a small value as window size. The reason for this is that a receiving buffer is filled with the data which the destination host 912 has just received. If the source host 911 which is informed of the small window size transmits data by that size and waits for an ACK to arrive, then network use efficiency falls. Therefore, the following method is adopted. When the destination host 912 receives data, the destination host 912 does not return an ACK instantly. That is to say, the destination host 912 returns an ACK after predetermined time. This is referred to as a delayed confirmation response.

To be concrete, the following processes are performed for a delayed confirmation response.

Until data is received twice, a confirmation response is not made (first pattern).

A confirmation response is delayed for a maximum of 0.5 seconds except in the above case (second pattern).

An ACK delayed in accordance with the second pattern is referred to as a delayed ACK. With the first pattern one ACK is returned for two pieces of data. In this case, the provision that ACKs need not be returned for all pieces of data transmitted is used. That is to say, an ACK includes a sequence number of a piece of data which the destination host 912 expects the source host 911 to transmit next. The source host 911 determines by the sequence number included in the ACK that all pieces of data sequence numbers of which come before the above sequence number have arrived correctly at the destination host 912. This is used in the case of a delayed confirmation response made in accordance with the first pattern. That is to say, ACKs are not returned for all pieces of data from the first and one ACK is returned for two pieces of data. By doing so, the number of transmitted packets falls and network use efficiency improves.

(See, for example, Japanese Laid-Open Patent Publication No. 2001-111618 and Japanese Laid-Open Patent Publication No. 2002-374301.)

However, when RTT is measured in conventional data communication in which a delayed confirmation response is made, it is impossible to distinguish an ACK made in accordance with the first pattern from an ACK made in accordance with the second pattern. With the second pattern RTT measured includes the time of a "Delayed ACK" made by intentionally delaying an ACK. Therefore, RTT measured in the case of the second pattern does not correctly indicate delay time taken to transmit and receive data on a network. There is a possibility that RTT measured includes delay time for making a "Delayed ACK" in accordance with the second pattern. As a result, the reliability of RTT is low (RTT may not be correct).

SUMMARY

According to one aspect of the present invention, a delay time measuring apparatus for measuring round trip time from the time of data being transmitted to the time of a confirmation response being received, includes a data analysis section which captures a data packet transmitted from a source unit to a destination unit, obtains a sequence number and data length from the data packet captured, adds receiving time to the sequence number and the data length, and stores the sequence number, the data length, and the receiving time in a storage section, and which captures an ACK packet returned from the destination unit to the source unit, obtains an ACK number from the ACK packet captured, adds receiving time to the ACK number, and stores the ACK number and the receiving time in the storage section, and a calculation section which obtains two successive data packets transmitted without waiting for the ACK packet from the storage section, obtains an ACK packet an ACK number of which is equal to a value obtained by adding data length of a second data packet of the two successive data packets to a sequence number of the second data packet of the two successive data packets from the storage section, and calculates the round trip time from receiving time of the second data packet of the two successive data packets and receiving time of the ACK packet obtained.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates a TCP session table.

DESCRIPTION OF EMBODIMENTS

Figure 1:
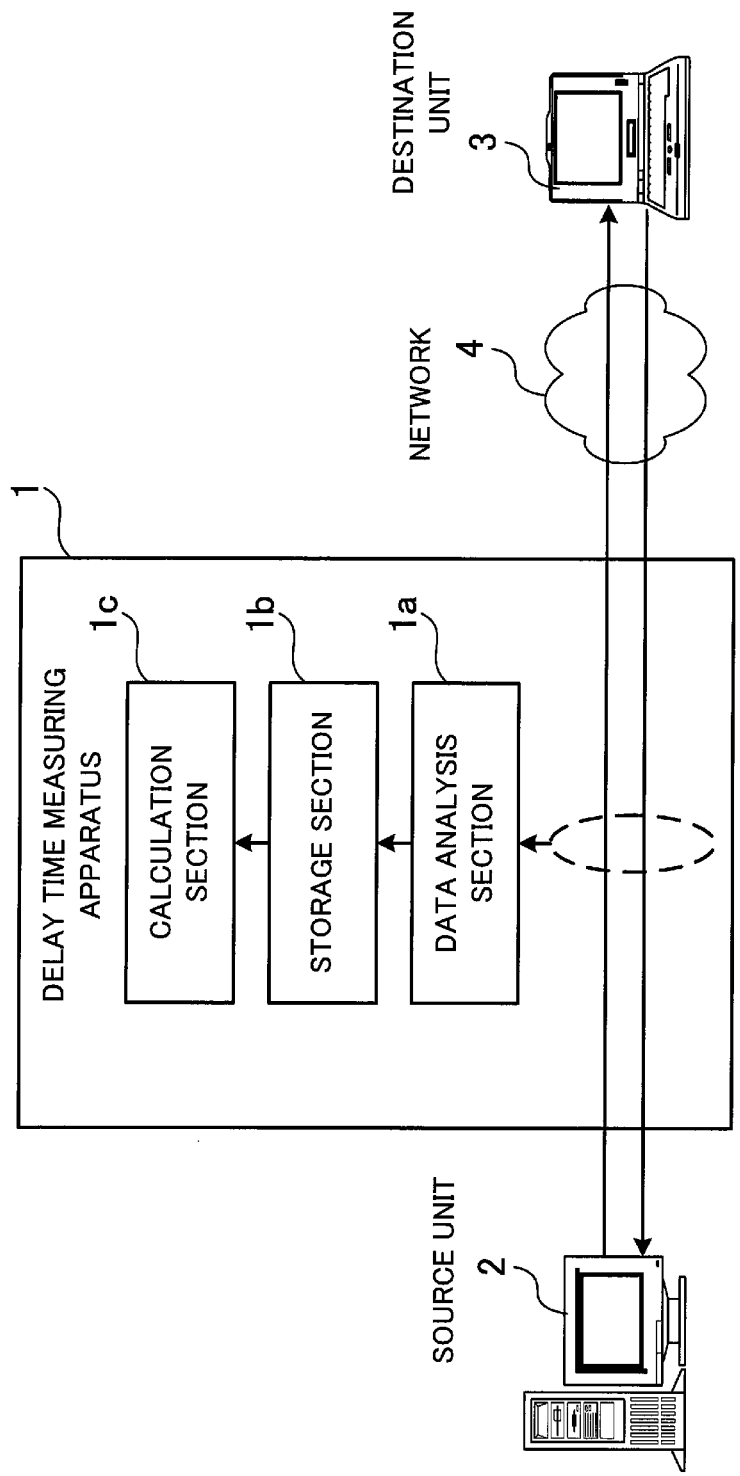
FIG. 1 gives an overview of an embodiment.

Embodiments of the present invention will now be described with reference to the accompanying drawings, wherein like reference numerals refer to like elements throughout.

FIG. 1 gives an overview of an embodiment. A delay time measuring apparatus 1 measures round trip time from the time of a source unit 2 transmitting data to the time of a confirmation response from a destination unit 3 being received. The delay time measuring apparatus 1 includes a data analysis section 1a, a storage section 1b, and a calculation section 1c.

The data analysis section 1a captures a data packet transmitted from a source unit 2 to a destination unit 3, obtains a sequence number and data length from the data packet, adds receiving time (time stamp) to the sequence number and the data length, and stores the sequence number, the data length, and the receiving time in the storage section 1b. The data length is a value obtained by subtracting the value of "IHL" indicative of the length of an IP header (see FIG. 11 described later) and the value of "header length" in a TCP header (see FIG. 12 described later) from the value of "Total Length" in the IP header. In addition, the data analysis section 1a captures an ACK packet returned from the destination unit 3 to the source unit 2, obtains an ACK number from the ACK packet, adds receiving time (time stamp) to the ACK number, and stores the ACK number and the receiving time in the storage section 1b.

The calculation section 1c obtains two successive data packets transmitted without waiting for the ACK packet (data packets used for transmitting two successive pieces of data) from the storage section 1b. In addition, the calculation section 1c obtains an ACK packet an ACK number of which is equal to a value obtained by adding a sequence number and data length of a second data packet of the two successive data packets from the storage section 1b. Then the calculation section 1c calculates delay time from receiving time of the second data packet of the two successive data packets and receiving time of the ACK packet obtained. To be concrete, the calculation section 1c considers the difference between the receiving time of the second data packet and the receiving time of the ACK packet as the round trip time.

With the above delay time measuring apparatus 1 the data analysis section 1a captures the data packet transmitted from the source unit 2 to the destination unit 3, and stores the sequence number, the data length, and the receiving time of the data packet in the storage section 1b. Furthermore, the data analysis section 1a captures the ACK packet returned from the destination unit 3 to the source unit 2, and stores the ACK number and the receiving time of the ACK packet in the storage section 1b. After that, the calculation section 1c obtains the two successive data packets transmitted without waiting for the ACK packet from the storage section 1b. In addition, the calculation section 1c obtains the ACK packet the ACK number of which is equal to the value obtained by adding the sequence number and the data length of the second data packet of the two successive data packets from the storage section 1b. Then the calculation section 1c calculates the round trip time from the receiving time of the second data packet of the two successive data packets and the receiving time of the ACK packet obtained.

By doing so, RTT can be measured on the basis of delayed confirmation responses not including a "delayed ACK". As a result, RTT in which delay in packet transmission that occurs on a network is correctly reflected can be obtained.

A delayed confirmation response will now be described in detail. With a delayed conformation response an ACK is returned at timing which complies with a first or second pattern.

Figure 2:
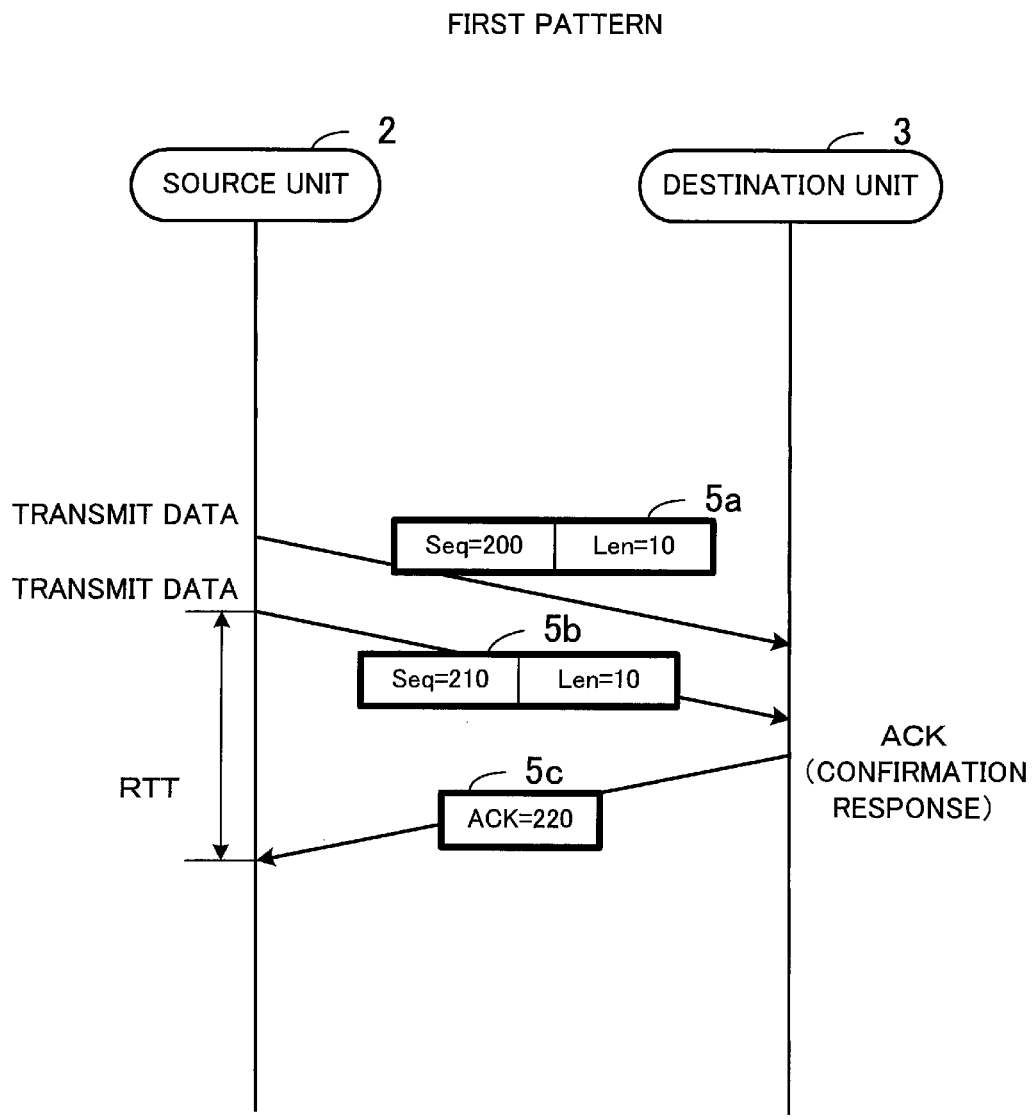
FIG. 2 illustrates a first pattern of ACK timing.

FIG. 2 illustrates a first pattern of ACK timing. With the first pattern the destination unit 3 returns an ACK when the destination unit 3 receives data twice. In this example, the source unit 2 transmits two data packets 5a and 5b to the destination unit 3. The destination unit 3 does not return an ACK of the data packet 5a but returns an ACK packet 5c of the data packet 5b to the source unit 2.

Each of the data packets 5a and 5b includes a sequence number (Seq).

A sequence number is a unique number assigned to a data packet transmitted. Data length is the size (indicated by, for example, bytes) of data transmitted. An initial value of a sequence number is assigned at the time of connection being established. While the connection is being established, a sequence number is updated each time a data packet is transmitted. A sequence number is updated by adding a value corresponding to the length of data transmitted.

In this example, it is assumed that data size is "10 bytes" and that a sequence number is "200" at the time of the data packet 5a being transmitted. In this case, a sequence number assigned to the data packet 5a is "Seq=200" and data length is "Len=10".

The source unit 2 can transmit data continuously (without waiting for an ACK) within the range of window size. Accordingly, the source unit 2 adds the value of the data length "Len=10" of the data packet 5a to the value of the sequence number "Seq=200" of the data packet 5a (Seq+Len) and updates the sequence number. Then the source unit 2 transmits the data packet 5b to which a sequence number after the update is assigned right after the data packet 5a. Therefore, a sequence number and data length of the data packet 5b are "Seq=210" and "Len=10" respectively.

When the destination unit 3 receives the data packets 5a and 5b, the destination unit 3 recognizes that the destination unit 3 has received data twice, and returns the ACK packet 5c to the source unit 2. The ACK packet 5c includes an ACK number. A sequence number of data which the destination unit 3 expects to receive next from the source unit 2 is designated as an ACK number. That is to say, an ACK number indicates that all data up to data right before data indicated by the ACK number has been received correctly. In this example, the destination unit 3 receives the data packets 5a and 5b, so the destination unit 3 receives 20 bytes of data from 200th data. Accordingly, the destination unit 3 transmits the ACK packet 5c to which the ACK number "220" is assigned to the source unit 2.

In this case, a period from the time of the source unit 2 transmitting the data packet 5b to the time of the source unit 2 receiving the ACK packet 5c is RTT.

Figure 3:
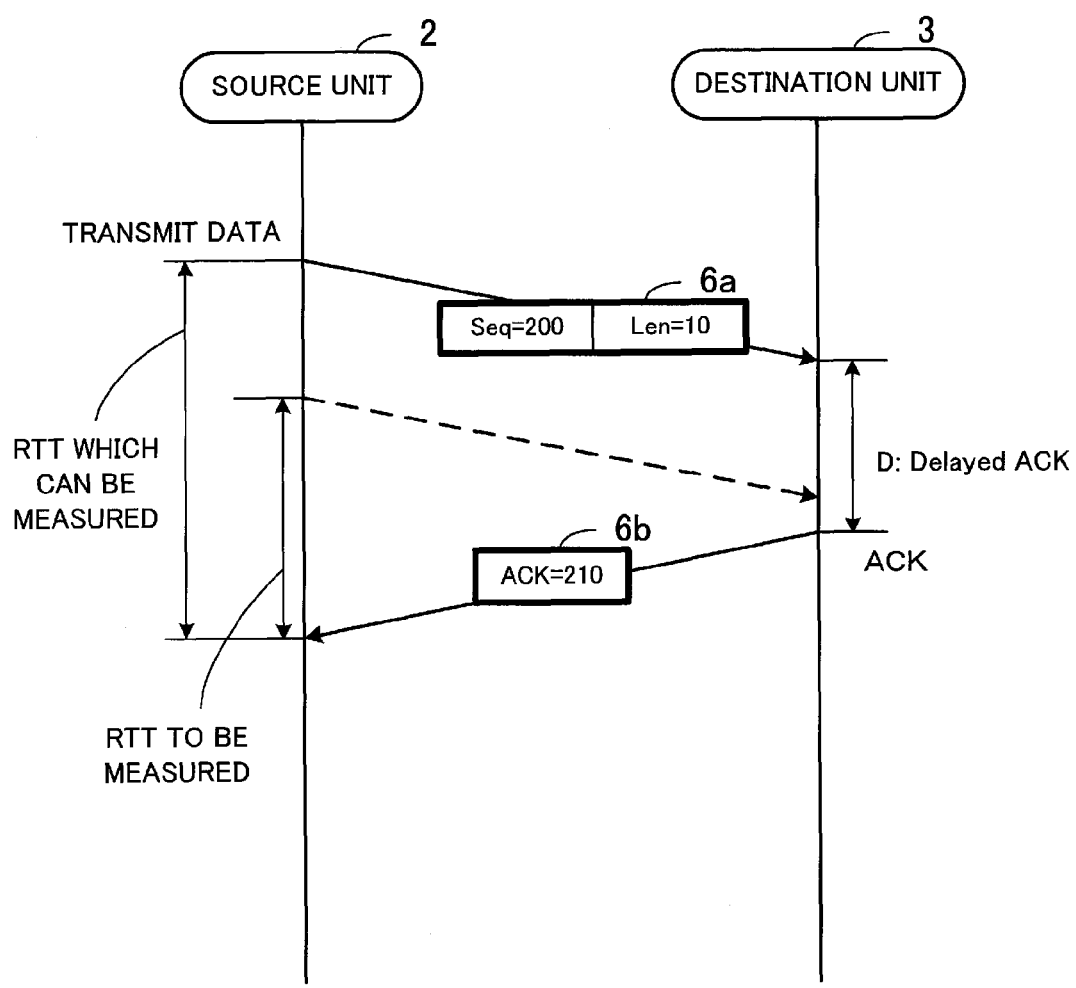
FIG. 3 illustrates a second pattern of ACK timing.

FIG. 3 illustrates a second pattern of ACK timing. With the second pattern a "Delayed ACK" is returned. In this example, the source unit 2 transmits one data packet 6a to the destination unit 3. However, data is not transmitted right after the data packet 6a. The destination unit 3 does not transmit an ACK of the data packet 6a and waits for a following packet. However, if a packet does not reach after a wait of predetermined time, then the destination unit 3 transmits an ACK packet 6b corresponding to the data packet 6a to the source unit 2. A confirmation response made by the use of the ACK packet 6b is a "Delayed ACK".

In this example, a sequence number and data length of the data packet 6a are "Seq=200" and "Len=10" respectively. After the elapse of predetermined delay time the destination unit 3 transmits the ACK packet 6b to which the ACK number "210" is assigned to the source unit 2.

A period from the time of the data packet 6b being transmitted to the time of the ACK packet 6b being received is RTT which can be measured near the source unit 2. However, this period includes excess delay time for making a "Delayed ACK". Delay time in data transmission which does not include intentional delay time for making the "Delayed ACK" is to be measured fundamentally as RTT. That is to say, if a time delay based on an intentional delay process performed by the destination unit 3 is included, then RTT does not indicate the communication quality of a network correctly.

The following can be seen by comparing the first pattern depicted in FIG. 2 and the second pattern depicted in FIG. 3. With the first pattern the destination unit 3 returns one ACK packet when the destination unit 3 receives a data packet twice. With the second pattern the destination unit 3 receives a data packet once. If a second data packet does not reach, then the destination unit 3 returns an ACK packet. That is to say, it is desirable that receiving a data packet twice is counted and that when an ACK number of a later ACK packet is equal to (sequence number (Seq)+data length (Len)), RTT is measured.

Figure 4:
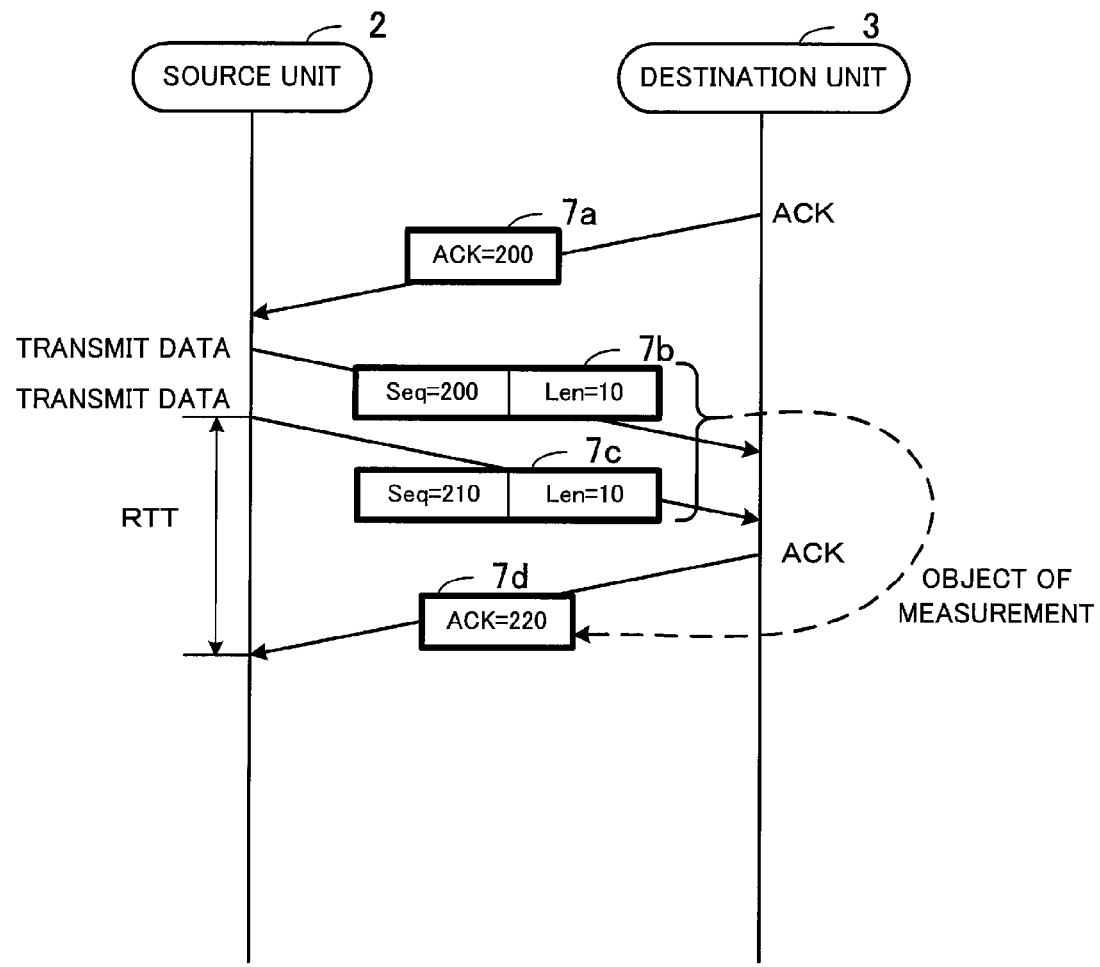
FIG. 4 illustrates a pattern of transmitting and receiving a packet for which delay time is to be measured.

FIG. 4 illustrates a pattern of transmitting and receiving a packet for which delay time is to be measured. In this example, the source unit 2 which receives an ACK packet 7a transmits two data packets 7b and 7c. The destination unit 3 transmits an ACK packet 7d after the destination unit 3 receives the data packet 7c.

In this case, the delay time measuring apparatus 1 checks that at least the two data packets 7b and 7c are transmitted between the ACK packets 7a and 7d. That is to say, the delay time measuring apparatus 1 compares the value of (sequence number+data length) of the data packet 7c with an ACK number of the ACK packet 7d and checks that they match. After that, the delay time measuring apparatus 1 checks that a difference of 20 between an ACK number of the ACK packet 7a transmitted from the destination unit 3 the last time and an ACK number of the ACK packet 7d transmitted from the destination unit 3 this time is greater than a data length (Len) of the data packet 7c of 10. As a result, the delay time measuring apparatus 1 can determine that at least one data packet exists before the data packet 7c. That is to say, the delay time measuring apparatus 1 can determine that the ACK packet 7d is not a "Delayed ACK". Then the delay time measuring apparatus 1 measures a period from the time of the second data packet 7c being transmitted to the time of the ACK packet 7d being received as RTT.

RTT is measured in this way on the condition that two data packets have been transmitted continuously. By doing so, an ACK packet corresponding to a "Delayed ACK" does not become an object of measurement. That is to say, only one data packet is transmitted between an ACK packet corresponding to a "Delayed ACK" and the preceding ACK packet. Therefore, the ACK packet corresponding to the "Delayed ACK" does not become an object of measurement. As a result, the delay time measuring apparatus 1 can measure RTT only in cases where an ACK is returned in accordance with the first pattern. Accordingly, RTT can be measured correctly.

By the way, the function of the delay time measuring apparatus 1 can be given to a monitoring apparatus for monitoring communication on a network. That is to say, RTT can be measured correctly by applying the technique depicted in FIG. 1 to a delay time measuring function of the monitoring apparatus. Therefore, embodiments will now be described in detail with a monitoring apparatus having a delay time measuring function as an example.

First Embodiment

In a first embodiment it is assumed that a monitoring apparatus for monitoring a signal (or a packet) branched from a network has a delay time measuring function. That is to say, if a device for transferring a copy of a packet from a transmission line is used, then the delay time measuring apparatus 1 can acquire the packet via the device. A switching hub having a port mirroring function or a network tap is used as a device for making a copy of a packet transmitted over a network.

The port mirroring function is a function to transmit a copy of a frame transmitted or received to a designated physical port. A frame is a unit of a signal transmitted at the data link layer of the open system interconnection (OSI) reference model. An IP packet is encapsulated by the use of a frame. Therefore, a data packet or an ACK packet can be taken out of a copy of a frame.

A network tap splits a signal on a transmission line in two by an optical splitter or the like and outputs one to a monitoring port. By using such a network tap, a copy of a packet can be outputted from a monitoring port without data loss. Accordingly, in the first embodiment a signal is split by the use of a network tap and is monitored.

Figure 5:
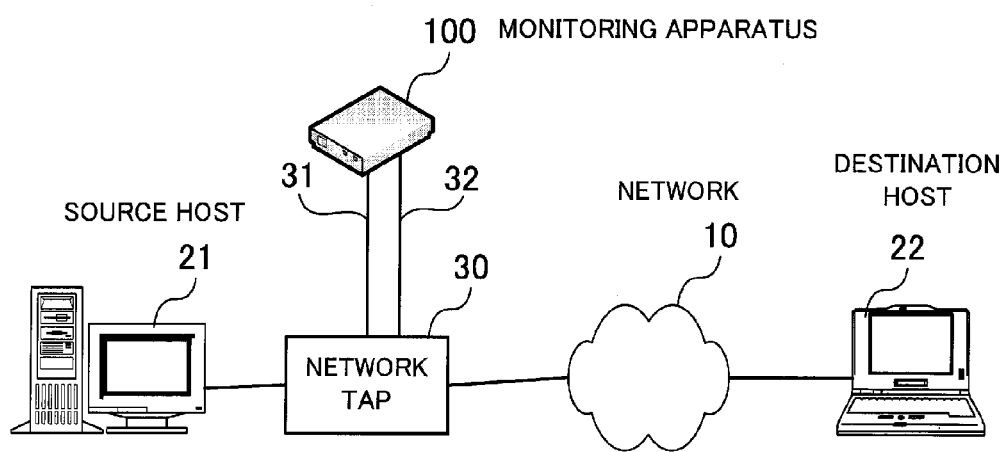
FIG. 5 illustrates an example structure of a system according to a first embodiment.

FIG. 5 illustrates an example structure of a system according to the first embodiment. A monitoring apparatus 100 measures delay time in communication between a source host 21 and a destination host 22. The source host 21 is connected to the destination host 22 via a network 10. A network tap 30 is connected between the source host 21 and the network 10. The network tap 30 makes a copy of a packet transmitted to or from the source host 21, and transmits the copy to the monitoring apparatus 100.

The network tap 30 and the monitoring apparatus 100 are connected by two communication cables 31 and 32. The communication cable 31 is used for transmitting a signal obtained by splitting a signal transmitted from the source host 21 to the destination host 22. The communication cable 32 is used for transmitting a signal obtained by splitting a signal transmitted from the destination host 22 to the source host 21. The monitoring apparatus 100 analyzes a packet received from the network tap 30 and measures round trip time (RTT).

Figure 6:
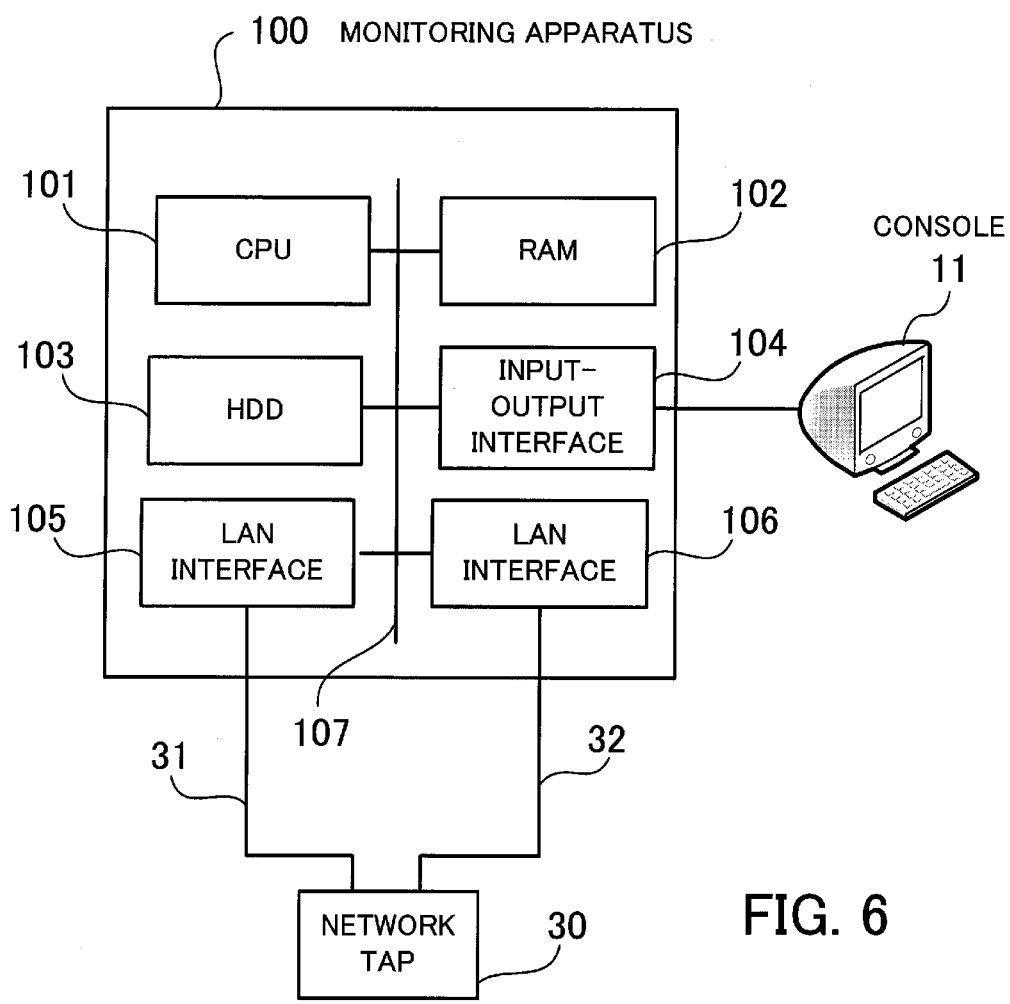
FIG. 6 illustrates an example hardware configuration of a monitoring apparatus used in the system according to the first embodiment.

FIG. 6 illustrates an example hardware configuration of the monitoring apparatus used in the system according to the first embodiment. The whole of the monitoring apparatus 100 is controlled by a central processing unit (CPU) 101. A random access memory (RAM) 102, a hard disk drive (HDD) 103, an input-output interface 104, and LAN interfaces 105 and 106 are connected to the CPU 101 via a bus 107.

The RAM 102 is used as main storage of the monitoring apparatus 100. The RAM 102 temporarily stores at least part of an operating system (OS) or an application program executed by the CPU 101. The RAM 102 also stores various pieces of data which the CPU 101 needs to perform a process. The HDD 103 is used as secondary storage of the monitoring apparatus 100. The HDD 103 stores the OS, application programs, and various pieces of data. A semiconductor memory such as a flash memory may be used as secondary storage.

The input-output interface 104 is a communication interface such as RC232C. A console 11 can be connected to the input-output interface 104. For example, by using the console 11, a system manager can input instructions to the monitoring apparatus 100 to begin to measure RTT, or display the value of RTT measured.

The LAN interface 105 is connected to the network tap 30 by the communication cable 31. A signal outputted from the source host 21 is split in two by the network tap 30. The LAN interface 105 acquires one via the communication cable 31. The LAN interface 105 recognizes a transmitted frame by the inputted signal and passes information included in the frame to the CPU 101.

The LAN interface 106 is connected to the network tap 30 by the communication cable 32. A signal inputted to the source host 21 is split in two by the network tap 30. The LAN interface 106 acquires one via the communication cable 32. The LAN interface 106 recognizes a transmitted frame by the inputted signal and passes information included in the frame to the CPU 101.

An ordinary communication interface acquires only packets transmitted thereto. However, the LAN interfaces 105 and 106 included in the monitoring apparatus 100 acquire all packets regardless of destination in order to perform monitoring. Moreover, a LAN interface for management may be added to the monitoring apparatus 100. In this case, a computer for management is connected to the LAN interface for management via a network. By operating the computer for management, the system manager can input instructions to the monitoring apparatus 100 to measure RTT, or copy measured RTT to the computer for management.

By adopting the above hardware configuration, the processing function of the first embodiment can be realized.

The functions of the monitoring apparatus 100 will now be described concretely.

Figure 7:
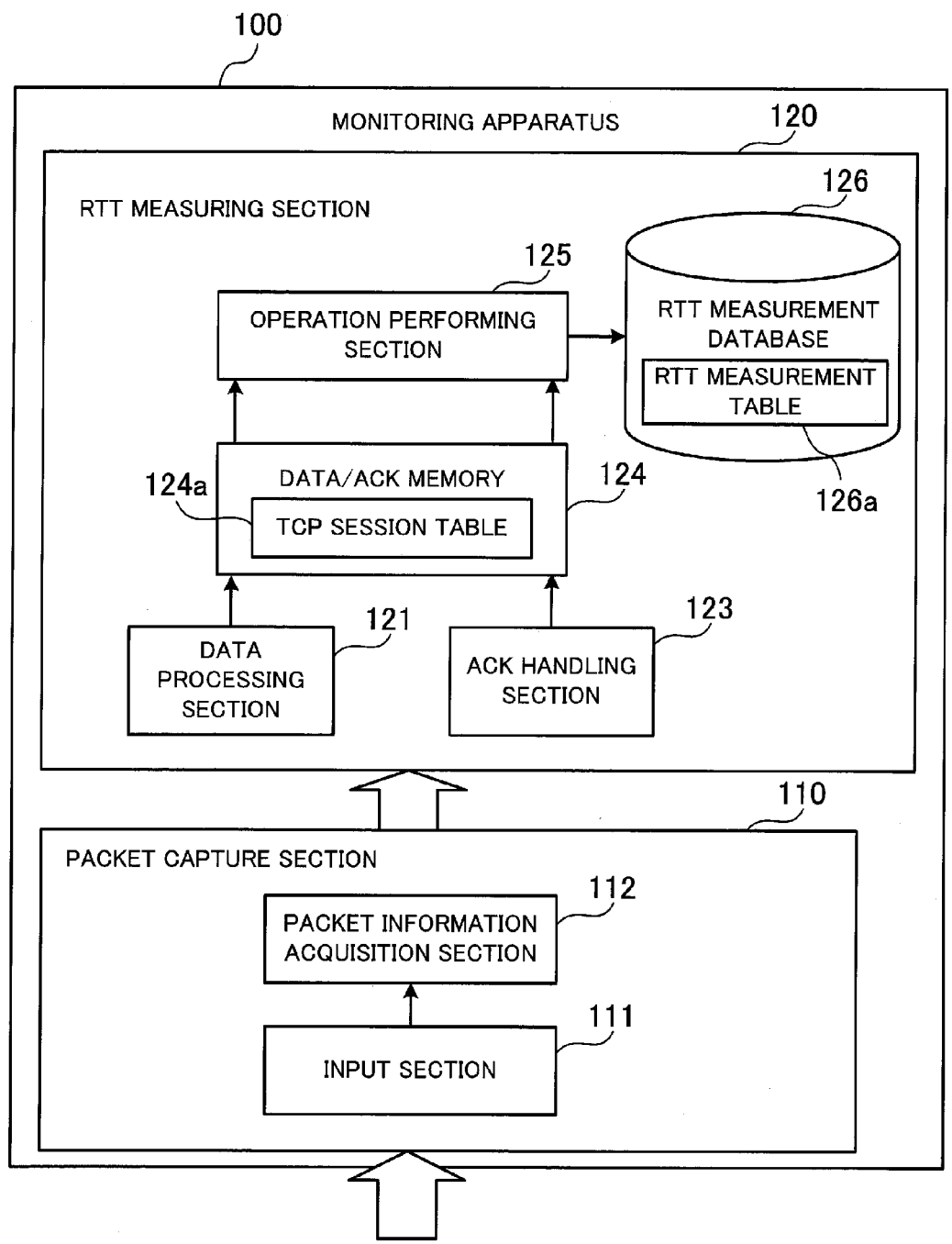
FIG. 7 is a block diagram of the functions of the monitoring apparatus.

FIG. 7 is a block diagram of the functions of the monitoring apparatus. The monitoring apparatus 100 includes a packet capture section 110 and an RTT measuring section 120.

The packet capture section 110 obtains a packet from a signal acquired from the network tap 30. Accordingly, the packet capture section 110 includes an input section 111 and a packet information acquisition section 112. The input section 111 accepts a data packet transmitted or an ACK packet returned. The packet information acquisition section 112 takes an IP header and a TCP header (both of which will hereinafter be referred to as header information) out of a packet, adds capture time (time stamp) to the IP header and the TCP header, and passes the IP header, the TCP header, and the capture time to the RTT measuring section 120.

The RTT measuring section 120 measures delay time on the basis of the information passed from the packet capture section 110. Accordingly, the RTT measuring section 120 includes a data processing section 121, an ACK handling section 123, a data/ACK memory 124, an operation performing section 125, and an RTT measurement database (DB) 126.

The data processing section 121 analyzes data on the basis of header information included in a data packet and stores an analysis result in the data/ACK memory 124. The ACK handling section 123 analyzes data on the basis of header information included in an ACK packet and stores an analysis result in the data/ACK memory 124.

The data/ACK memory 124 stores the result of the analysis performed by the data processing section 121. In addition, the data/ACK memory 124 stores the result of the analysis performed by the ACK handling section 123. For example, part of a storage area of the RAM 102 is used as the data/ACK memory 124. To be concrete, the results of the analyses performed by the data processing section 121 and the ACK handling section 123 are set in a TCP session table 124a stored in the data/ACK memory 124. The TCP session table 124a is a data table for managing TCP session information which can be recognized on the basis of each packet captured.

The operation performing section 125 reads out data from the data/ACK memory 124, determines whether to measure delay time, and calculates RTT.

The RTT measurement database 126 stores the RTT measurement. For example, part of a storage area of the HDD 103 is used as the RTT measurement database 126.

FIG. 8 illustrates the TCP session table. The TCP session table 124a includes TCP Session ID, Source IP Address, Data Packets, and Preceding ACK columns.

Identification data (TCP session ID) for uniquely identifying a TCP session between the source host 21 and the destination host 22 is set in the TCP Session ID column. A TCP session ID is a value uniquely determined from a combination of a source IP address, a source port number, a destination IP address, and a destination port number included in a TCP/IP packet. Even if the source IP address and the source port number are replaced with the destination IP address and the destination port number, respectively, and vice versa, the same session ID is obtained.

A source IP address (SA) included in a packet is set in the Source IP Address column.

Information regarding each data packet transmitted from a corresponding source IP address in a same session is set in the Data Packets column. Information regarding data packets detected in that session is set as first data packet information (DP1), second data packet information (DP2), and so on in order of detection. Information regarding each data packet set includes receiving time (Time), a sequence number (Seq), and data length (Len).

An ACK number of an ACK packet detected last in communication in a TCP session is set in the Preceding ACK column.

Figure 9:
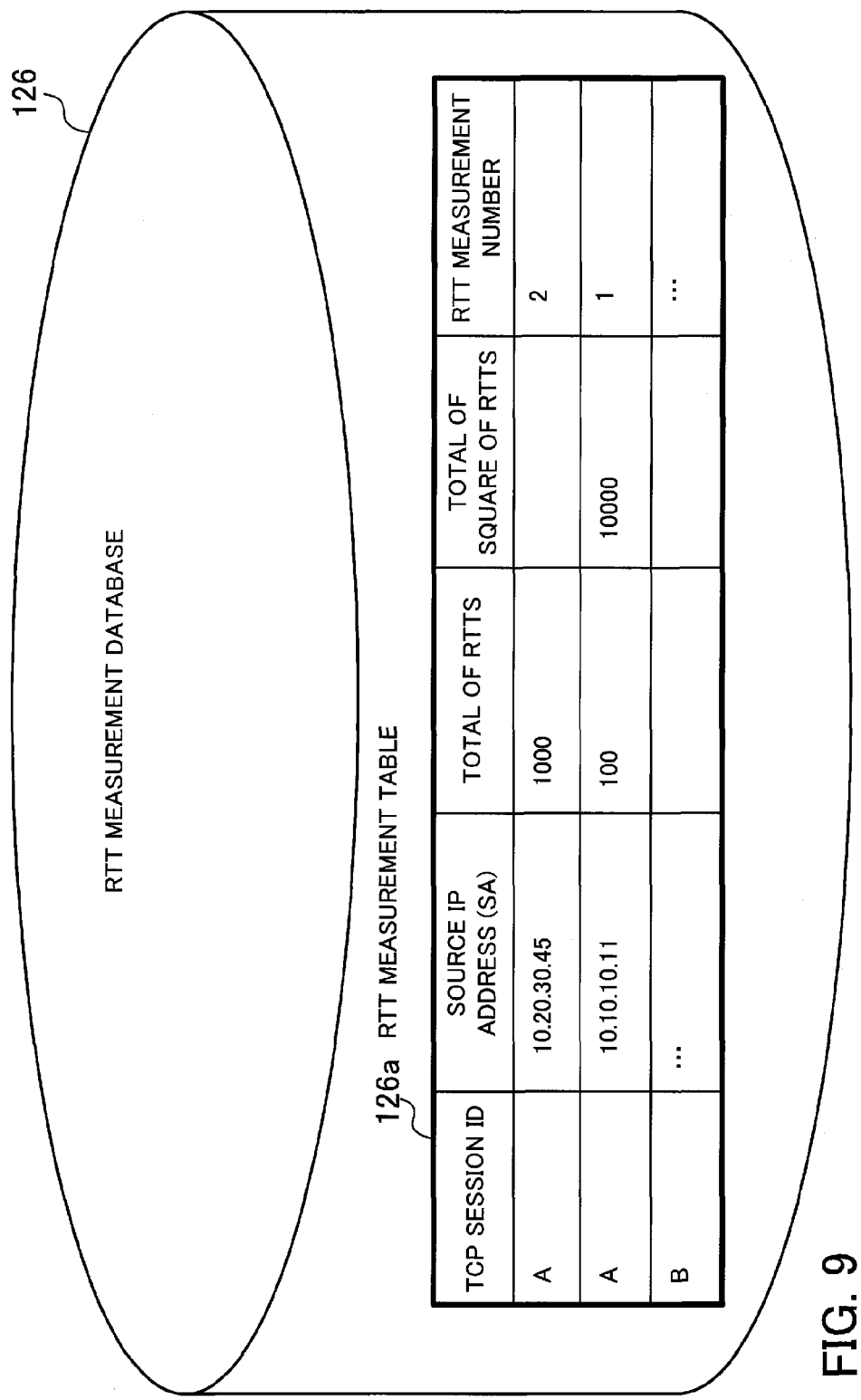
FIG. 9 is an example data structure of an RTT measurement database.

FIG. 9 is an example data structure of the RTT measurement database. The RTT measurement database 126 stores an RTT measurement table 126a. The RTT measurement table 126a includes TCP Session ID, Source IP Address, Total of RTTs, Total of Square of RTTs, and RTT Measurement Number columns. The Total of RTTs column indicates a value obtained by adding up RTT measurements.

A TCP session ID of a session detected is set in the TCP Session ID column.

An IP address of a source of a packet detected in a corresponding session is set in the Source IP Address column.

The total of RTTs measured on the basis of a data packet transmitted from a node indicated by a source IP address corresponding to a session and an ACK packet for the data packet is set in the Total of RTTs column.

The total of the square of RTTs measured on the basis of a data packet transmitted from a node indicated by a source IP address corresponding to a session and an ACK packet for the data packet is set in the Total of Square of RTTs column.

The number of RTTs measured on the basis of a data packet transmitted from a node indicated by a source IP address corresponding to a session and an ACK packet for the data packet is set in the RTT Measurement Number column.

Figure 10:
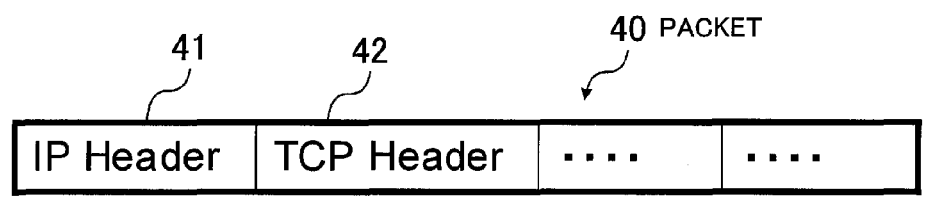
FIG. 10 illustrates the structure of a packet.

FIG. 10 illustrates the structure of a packet. A TCP/IP packet 40 includes an IP header 41 and a TCP header 42. The IP header 41 includes information for performing communication in accordance with IP which is a network layer protocol. The TCP header 42 includes information for performing communication in accordance with TCP which is a transport layer protocol.

Figure 11:
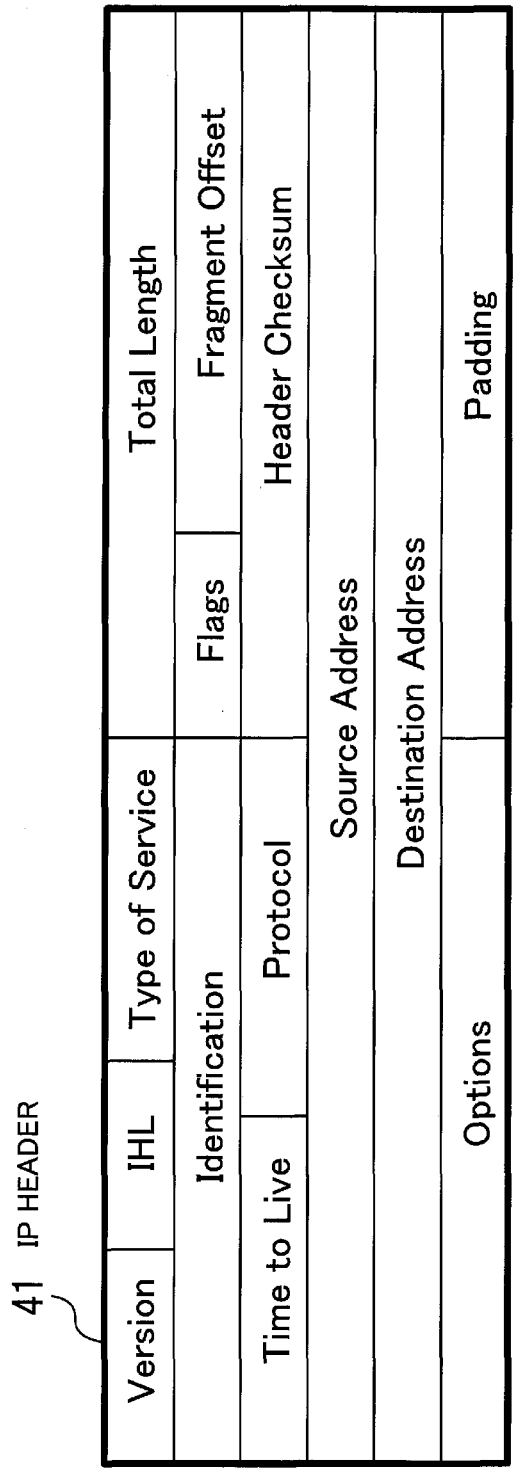
FIG. 11 illustrates the structure of an IP header.

FIG. 11 illustrates the structure of the IP header. The IP header 41 includes Version (version), IHL (header length), Type of Service (service type), Total Length (packet length), Identification (identifier), Flags (flag), Fragment Offset (fragment offset), Time to Live (lifetime), Protocol (protocol), Header Checksum (header checksum), Source Address (source address), Destination address (destination address), Options (option), and Padding (padding) fields.

The version of IP is indicated in the Version field. The length of the IP header 41 is indicated by the 4 bytes in the IHL field. The quality of an IP service is indicated in the Type of Service field. The length of an entire packet including the IP header 41 and IP data is indicated in the Total Length field. A unique value for identifying the IP packet is indicated in the Identification field. Control information regarding packet fragmentation is indicated in the Flags field. Which bit from the head of data before division data after the division starts at is indicated in the Fragment Offset field. The number of routers an IP datagram can pass through is indicated in the Time to Live field. A protocol for the data included in the IP packet is indicated in the Protocol field (with TCP "6" is indicated). A value for checking whether the IP header is corrupted is indicated in the Header Checksum field. An IP address of a source of the packet is indicated in the Source Address field. (If the packet is a data packet, then a source is the source host 21. If the packet is an ACK packet, then a source is the destination host 22.) An IP address of a destination of the packet is indicated in the Destination Address field. (If the packet is a data packet, then a destination is the destination host 22. If the packet is an ACK packet, then a destination is the source host 21.) The Options field is used for, for example, a test, and a source of the packet can set a time stamp indicative of transmission time in the Options field. If the header length is not an integral multiple of 32 bits because of adding an option, pad data for making the header length an integral multiple of 32 bits is indicated in the Padding field.

The data processing section 121 obtains the source IP address from a data packet including the above IP header 41 and sets the source IP address in the TCP session table 124a. Similarly, the ACK handling section 123 obtains the source IP address from an ACK packet including the above IP header 41 and sets the source IP address in the TCP session table 124a.

Figure 12:
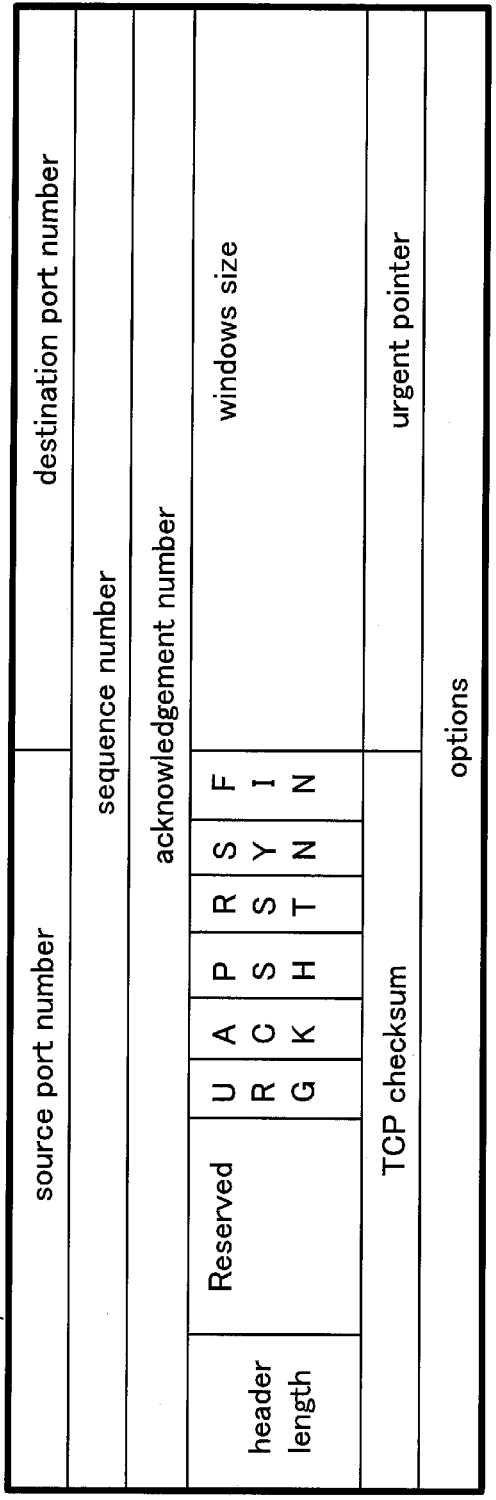
FIG. 12 illustrates the structure of a TCP header.

FIG. 12 illustrates the structure of the TCP header. The TCP header 42 includes Source Port Number (source port number), Destination Port Number (destination port number), Sequence Number (sequence number), ACK Number (acknowledgement number), Header Length (header length), Reserved (reserve area), Code Bit (URG, ACK, PSH, RST, SYN, and FIN), Window Size (window size), TCP Checksum (checksum), Urgent Pointer (urgent pointer), and Options (option) fields.

A number indicative of a program which transmits the packet is indicated in the Source Port Number field. A number indicative of a program which is supposed to receive the packet is indicated in the Destination Port Number field. A sequence number which the source host 21 assigns at the time of transmitting a data packet is indicated in the Sequence Number field. An ACK number which the destination host 22 assigns at the time of transmitting an ACK packet is indicated in the ACK Number field, and indicates a sequence number of a data packet which the destination host 22 expects to receive next. The length of the TCP header 42 is indicated in the Header Length field. The Reserved field is prepared for future extension.

Various control flags are indicated in the Code Bit field. The value "1" of URG indicates that data to be urgently processed is included. The value "1" of ACK indicates that a confirmation response number is used. The value "1" of PSH indicates that received data is instantly delivered from TCP to an upper application. The value "1" of RST indicates that some cause has led to a communication failure and that control cannot be exercised. The value "1" of SYN indicates that a sequence number is set to the sequence number indicated in this TCP header. The value "1" of FIN indicates that data transmitted from a sending end ends.

What amount of data from the sequence number indicated in the ACK Number field can be received is indicated in the Window Size field. A value for checking whether the TCP header or the data is corrupted is indicated in the TCP Checksum field. A pointer indicative of a location where urgent data is stored is indicated in the Urgent Pointer field, and becomes valid when URG is "1". Arbitrary data is indicated in the Options field.

The data processing section 121 obtains the sequence number from a data packet including the above TCP header 42 and sets the sequence number in the TCP session table 124a. In addition, the data processing section 121 obtains data included in the data packet and sets the length of the data in the TCP session table 124a as data length. Furthermore, the data processing section 121 calculates a TCP session ID corresponding to the data packet, sets the TCP session ID in the TCP session table 124a, and sets the time when the data packet is received in the TCP session table 124a.

The ACK handling section 123 obtains the ACK number from an ACK packet including the above TCP header 42 and sets the ACK number in the TCP session table 124a. In addition, the ACK handling section 123 calculates RTT on the basis of the time of the ACK packet being received.

A procedure for measuring RTT will now be described.

Figure 13:
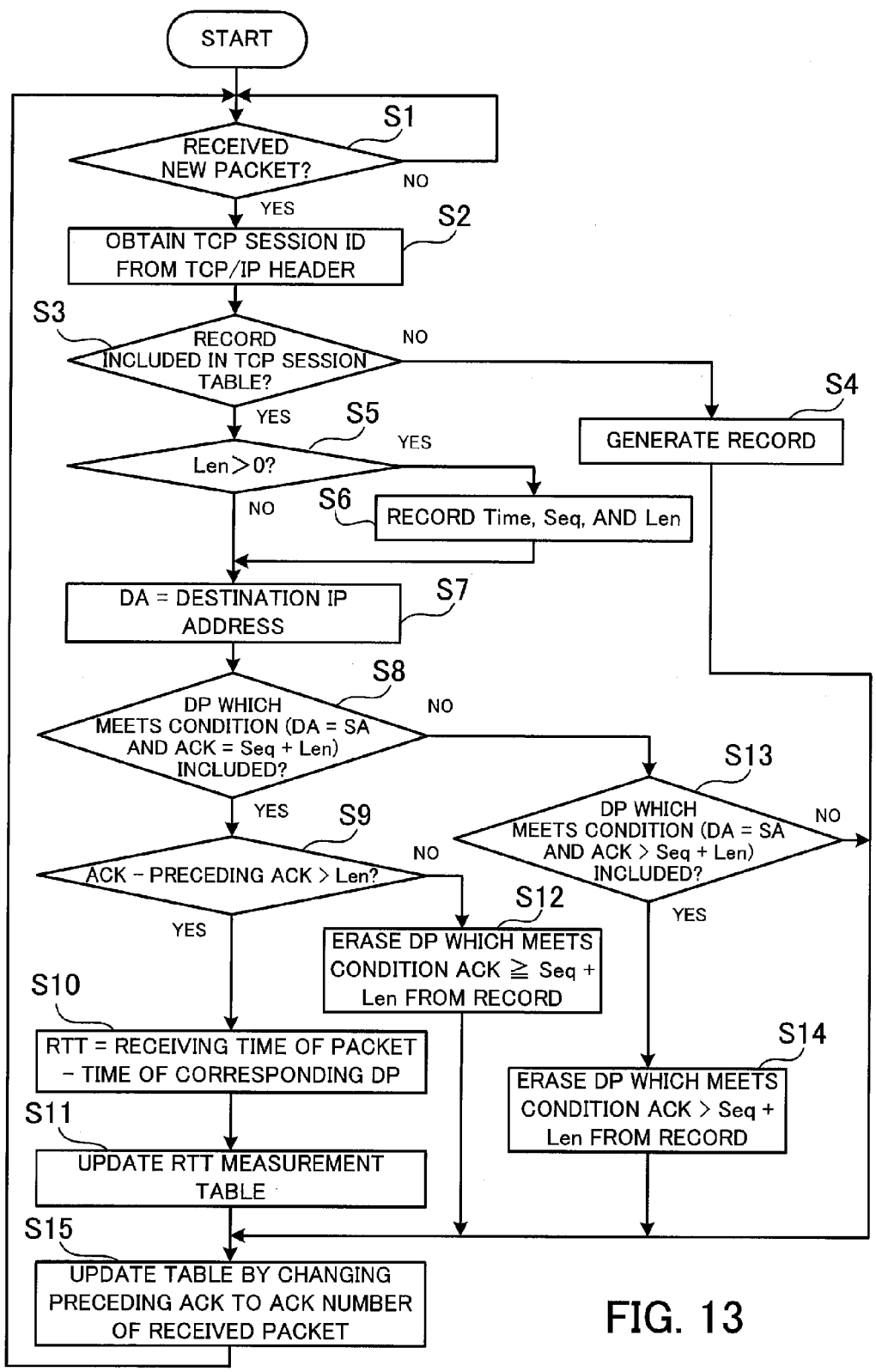
FIG. 13 is a flowchart of a procedure for measuring RTT.

FIG. 13 is a flowchart of a procedure for measuring RTT. Each of the data processing section 121 and the ACK handling section 123 determines first whether it has received a new packet (step S1). If each of the data processing section 121 and the ACK handling section 123 has not received a new packet, then it waits until it receives a new packet (repeat step S1). When each of the data processing section 121 and the ACK handling section 123 receives a new packet (YES in step S1), it generates a TCP session ID from a combination of a source IP address, a source port number, a destination IP address, and a destination port number included in a TCP/IP packet received (step S2). In a same TCP/IP session a combination of an IP address and a port number may correspond to a source or a destination. Accordingly, even if a combination of an IP address and a port number corresponding to a source is replaced with a combination of an IP address and a port number corresponding to a destination and vice versa, these sessions can be considered the same. In this embodiment, a TCP session ID is an identifier used for determining whether received TCP/IP packets belong to the same session (connection). Even if an IP address and a port number corresponding to a source are replaced with an IP address and a port number corresponding to a destination and vice versa, the determination that these sessions are the same can be made on the basis of a TCP session ID.

Each of the data processing section 121 and the ACK handling section 123 determines whether a record including to the TCP session ID and the source IP address of the received packet is included in the TCP session table 124a (step S3). If a corresponding record is not included in the TCP session table 124a (NO step S3), then the data processing section 121 registers a new record including the TCP session ID and the source IP address in the TCP session table 124a (step S4). This process is performed when a packet for establishing a TCP session is received. For example, it is assumed that a packet which the source host 21 transmits to the destination host 22 for making a request to establish a session is detected. In this case, a record including a TCP session ID and a source IP address (IP address of the source host 21) corresponding to the detected packet is added to the TCP session table 124a. Next, it is assumed that a packet indicative of a response from the destination host 22 to the request made by the source host 21 to establish a session is detected. Then a record including a TCP session ID and a source IP address (IP address of the destination host 22) corresponding to the detected packet is added to the TCP session table 124a.

If a corresponding record is included in the TCP session table 124a in step S3 (YES in step S3), then each of the data processing section 121 and the ACK handling section 123 determines whether data length (Len) of the received packet is longer than 0 (step S5). If the data length (Len) is longer than or equal to 0 (YES in step S5) then the data processing section 121 records receiving time (Time), a sequence number (Seq), and the data length (Len) of the data packet in the corresponding record of the TCP session table 124a as DPx (x=1, 2, ... N) (step S6). In this case, "x" is a figure indicative of order of data packet information in the corresponding record. "N" is a natural number. "N" which is the maximum number of data packets recorded in one record is an arbitrary number. In this case, it is assumed that "N" is finite. If "N" is finite and there is no area to record an excess data packet (information regarding N data packets is already recorded) in step S6, then recording is not performed.

Then the ACK handling section 123 treats the destination IP address of the received packet as DA (step S7).

The ACK handling section 123 extracts a record in which the same TCP session ID that is assigned to the received packet is set and in which the destination IP address (DA) of the received packet is set as a source IP address (SA) from the TCP session table 124a. Then the ACK handling section 123 determines whether data packet information (DP) which meets the condition that a value obtained by adding data length (Len) to a sequence number (Seq) is equal to an ACK number (ACK) of the received packet (DA=SA and ACK=Seq+Len) is included in the record (step S8).

If corresponding data packet information is detected in step S8 (YES in step S8), then a data packet corresponding to the ACK has already been received by the monitoring apparatus 100. In this case, it is necessary to determine whether the received packet is an ACK of a single data packet or an ACK of plural data packets. Accordingly, the ACK handling section 123 determines whether the difference between the ACK of the received packet and a preceding ACK included in the extracted record is greater than data length (Len) included in the detected data packet information (step S9).

If the difference between the ACK of the received packet and the preceding ACK included in the extracted record is greater than the data length (Len) included in the detected data packet information (YES in step S9), then the ACK handling section 123 recognizes that before the corresponding data packet information is recorded, other successive data packets are received. As a result, the ACK handling section 123 can determine that the ACK is made in accordance with the first pattern. That is to say, RTT can be measured correctly. Accordingly, the ACK handling section 123 considers a value obtained by subtracting "Time" included in the corresponding data packet information detected in step S8 from receiving time of the packet as RTT (step S10).

The ACK handling section 123 which calculates RTT updates the RTT measurement table 126a on the basis of the calculated RTT (step S11). To be concrete, the ACK handling section 123 searches the RTT measurement table 126a for a record including the TCP session ID and a source IP address included in the record extracted in step S8. If a corresponding record is not found, then the ACK handling section 123 adds a new record including the TCP session ID and the source IP address to the RTT measurement table 126*a*. Initial values in the Total of RTTs, Total of Square of RTTs, and RTT Measurement Number columns of the record newly added are "0". The ACK handling section 123 adds the RTT value calculated in step S10 to the Total of RTTs column of the record extracted or newly added. In addition, the ACK handling section 123 adds the square of the RTT value calculated in step S10 to the Total of Square of RTTs column of the record extracted or newly added. Furthermore, the ACK handling section 123 adds (increments) "1" to the RTT Measurement Number column of the record extracted or newly added.

If the difference between the ACK of the received packet and the preceding ACK included in the extracted record is not greater than the data length (Len) included in the detected data packet information (NO in step S9) then the ACK handling section 123 can determine that the ACK is made in accordance with the second pattern in which RTT cannot be measured correctly. Accordingly, the ACK handling section 123 erases the data packet information corresponding to the ACK of the received packet (value obtained by adding the data length to the sequence number is equal to the ACK number of the received packet) and data packet information registered before that data packet information from the record of the TCP session table 124*a* extracted in step S8 (step S12).

If corresponding data packet information cannot be detected in step S8, then the ACK handling section 123 can determine that the monitoring apparatus 100 cannot receive a data packet for some reason and that the monitoring apparatus 100 receives only the ACK packet. In this case, the ACK handling section 123 extracts a record in which the same TCP session ID that is assigned to the received packet is set and in which the destination IP address (DA) of the received packet is set as a source IP address (SA) from the TCP session table 124*a*. Then the ACK handling section 123 determines whether data packet information (DP) which meets the condition that a value obtained by adding data length (Len) to a sequence number (Seq) is smaller than the ACK number (ACK) of the received packet (DA=SA and ACK>Seq+Len) is included in the record (step S13).

If corresponding data packet information is included in a corresponding record as a result of the determination made in step S13, then the ACK handling section 123 erases data packet information registered before the corresponding data packet information of the corresponding record from the TCP session table 124*a* (step S14).

As described in steps S12 and S14, a finite area for recording data packet information can be reused by properly erasing the data packet information which is not necessary for measuring RTT.

The ACK handling section 123 changes a preceding ACK included in the record in which the same TCP session ID that is assigned to the received packet is set and in which the destination IP address (DA) of the received packet is set as a source IP address (SA) to the ACK number of the received packet after step S11, S12, or S14 (step S15). After that, the procedure returns to step S1.

A concrete example of extracting only ACKs made in accordance with the first pattern in the case of ACKs made in accordance with the first and second patterns mingling and of measuring RTT will now be described.

Figure 14:
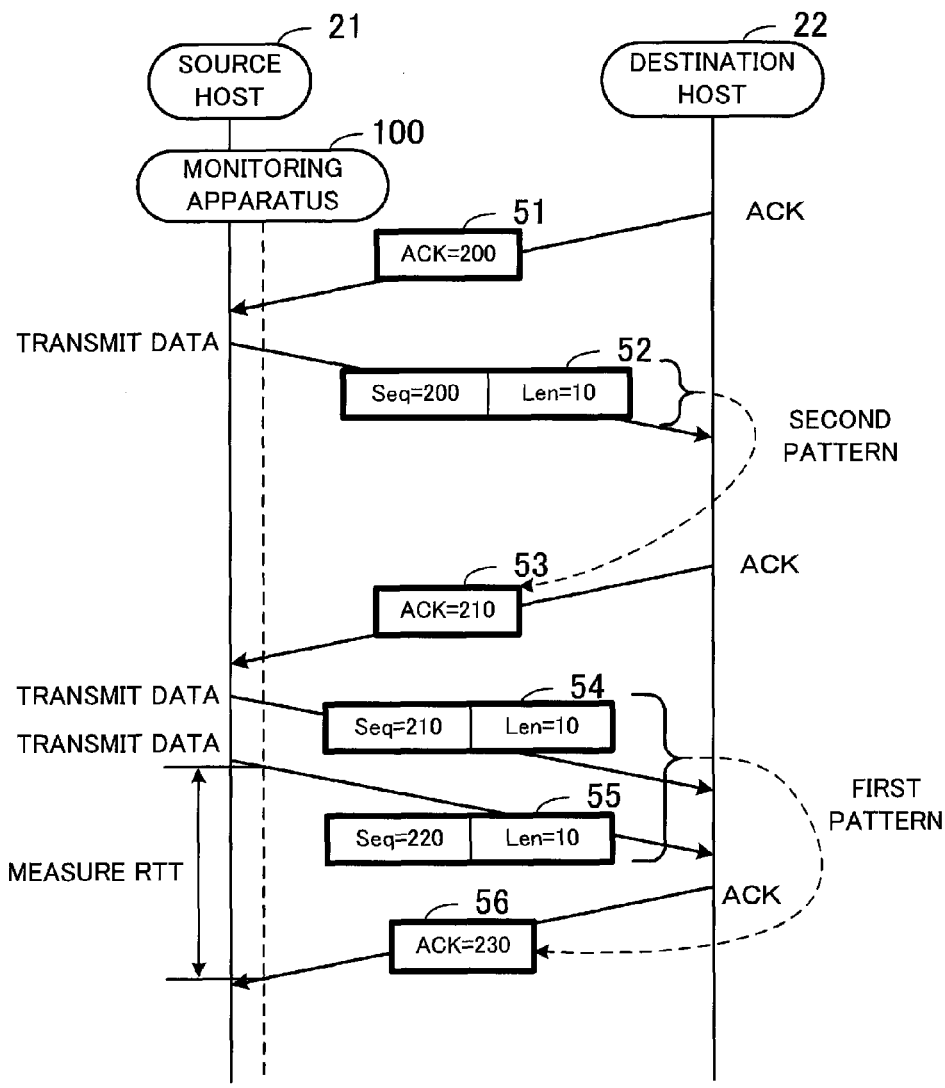
FIG. 14 is a sequence diagram of a procedure performed in the case of ACKs made in accordance with the first and second patterns mingling.

FIG. 14 is a sequence diagram of a procedure performed in the case of ACKs made in accordance with the first and second patterns mingling. In this example, the source host 21 which receives an ACK packet 51 (ACK number is "200") from the destination host 22 transmits a data packet 52 (sequence number is "200" and data length is "10") to the destination host 22. The destination host 22 transmits an ACK packet 53 (ACK number is "210") to the source host 21 in response to the data packet 52.

After receiving the ACK packet 53, the source host 21 transmits a data packet 54 (sequence number is "210" and data length is "10") and a data packet 55 (sequence number is "220" and data length is "10") in succession (without waiting until the receiving of an ACK). The destination host 22 transmits one ACK packet 56 (ACK number is "230") to the source host 21 in response to the two data packets 54 and 55.

In this case, the ACK packet 53 is an ACK of the data packet 52. Accordingly, the ACK packet 53 is an ACK made in accordance with the second pattern. In addition, the ACK packet 56 is an ACK of the two successive data packets 54 and 55. Accordingly, the ACK packet 56 is an ACK made in accordance with the first pattern.

Each packet is branched by the network tap 30 installed short of the source host 21 and is transmitted to the monitoring apparatus 100. The monitoring apparatus 100 detects two successive data packets first. Accordingly, the data packets 54 and 55 are detected. The ACK packet 51 is returned in response to a data packet transmitted just before the data packet 52 and the ACK packet 53 is returned in response to the data packet 52. That is to say, the data packet 52 and another data packet are not transmitted in succession. Therefore, the data packet 52 is not detected.

Then the monitoring apparatus 100 detects the ACK packet 56 the ACK number of which is equal to a value obtained by adding the data length of the second data packet 55 of the two successive data packets 54 and 55 detected to the sequence number of the data packet 55. The monitoring apparatus 100 measures a period from the time of the data packet 55 being transmitted to the time of the ACK packet 56 being received as RTT. In this case, RTT is measured for a delayed confirmation response made invariably in accordance with the first pattern and therefore indicates a data delay on the network correctly. That is to say, the RTT measured does not include delay time for making a "Delayed ACK".

In the example depicted in FIG. 14, the ACK made in accordance with the first pattern does not overlap with the ACK made in accordance with the second pattern for the sake of simplicity. However, if window size is large at the time of data transmission, three or more data packets may be transmitted in succession. In such a case, ACKs which are made in accordance with the first and second patterns and which are detected may overlap.

Figure 15:
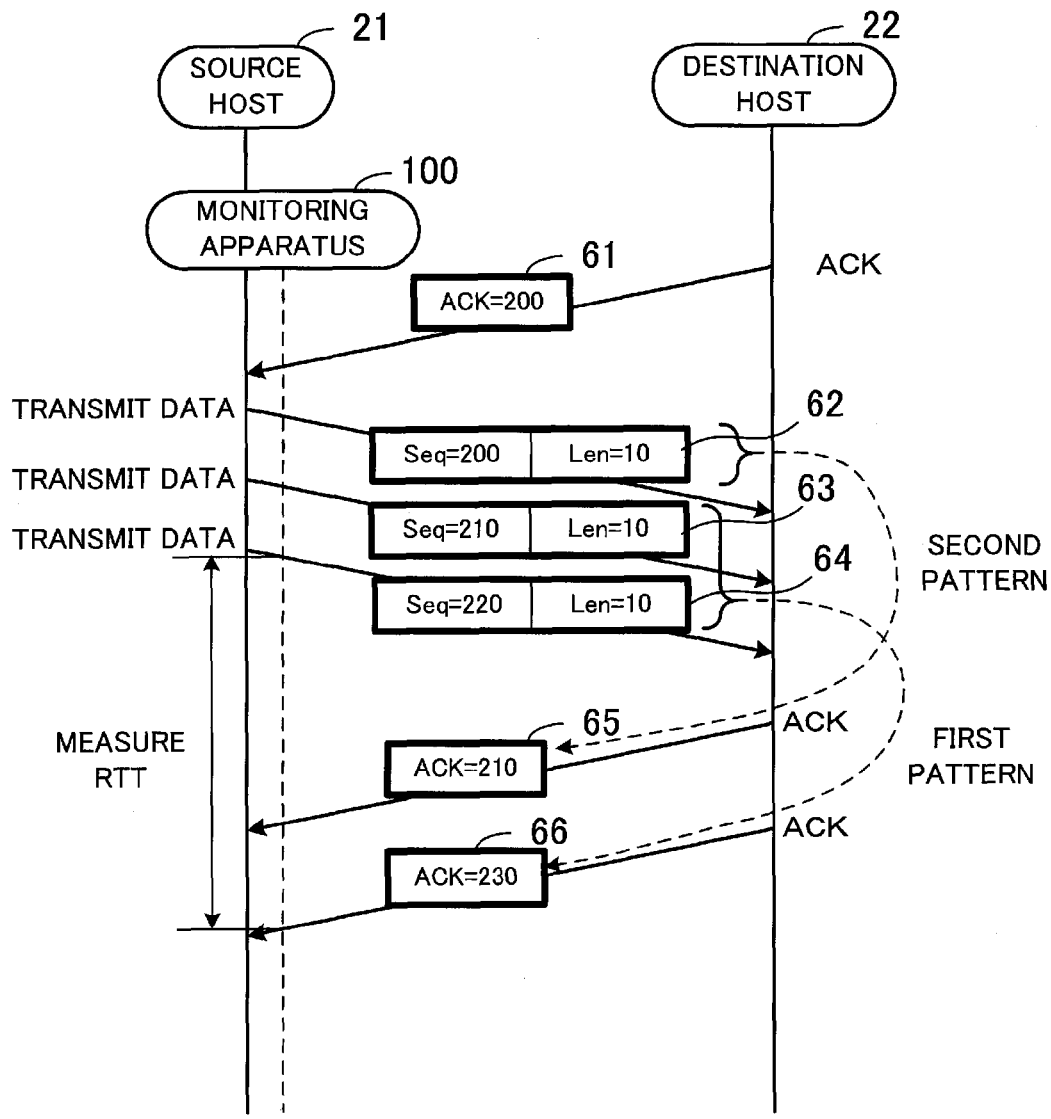
FIG. 15 is a sequence diagram of a procedure performed in the case of ACKs made in accordance with the first and second patterns overlapping.

FIG. 15 is a sequence diagram of a procedure performed in the case of ACKs made in accordance with the first and second patterns overlapping. In this example, the source host 21 which receives an ACK packet 61 (ACK number is "200") from the destination host 22 transmits a data packet 62 (sequence number is "200" and data length is "10"), a data packet 63 (sequence number is "210" and data length is "10"), and a data packet 64 (sequence number is "220" and data length is "10") in succession (without waiting until the receiving of an ACK).

The destination host 22 transmits an ACK packet 65 (ACK number is "210") to the source host 21 in response to the data packet 62. In addition, the destination host 22 transmits an ACK packet 66 (ACK number is "230") to the source host 21 in response to the two data packets 63 and 64.

The ACK packet 65 is an ACK of the data packet 62. Accordingly, the ACK packet 65 is an ACK made in accordance with the second pattern. In addition, the ACK packet 66 is an ACK of the two successive data packets 63 and 64. Accordingly, the ACK packet 66 is an ACK made in accordance with the first pattern.

The monitoring apparatus 100 captures these packets short of the source host 21. The monitoring apparatus 100 detects two successive data packets first. That is to say, the data packets 63 and 64 are detected. The ACK packet 61 is returned in response to a data packet transmitted just before the data packet 62. The ACK packet 65 is returned in response to the data packet 62. Accordingly, the determination that the data packet 62 and another data packet are not transmitted in succession is made. That is to say, even if the data packets 62 and 63 are transmitted in succession, the ACK packet 65 is returned in response to the first data packet 62. In this case, the determination that the data packets 62 and 63 are two successive data packets is not made. Accordingly, the data packet 62 is not detected.

Then the monitoring apparatus 100 detects the ACK packet 66 the ACK number of which is equal to a value obtained by adding the data length of the second data packet 64 of the two successive data packets 63 and 64 detected to the sequence number of the data packet 64. The monitoring apparatus 100 measures a period from the time of the data packet 64 being transmitted to the time of the ACK packet 66 being received as RTT.

In this case, RTT is measured for a delayed confirmation response made invariably in accordance with the first pattern and therefore indicates a data delay on the network correctly. That is to say, the RTT measured does not include delay time for making a "Delayed ACK". Accordingly, even if ACKs which are made in accordance with the first and second patterns overlap, RTT can be measured correctly.

Second Embodiment

In a second embodiment, a network tap is not used and a monitoring apparatus is installed between a source host and a destination host.

Figure 16:
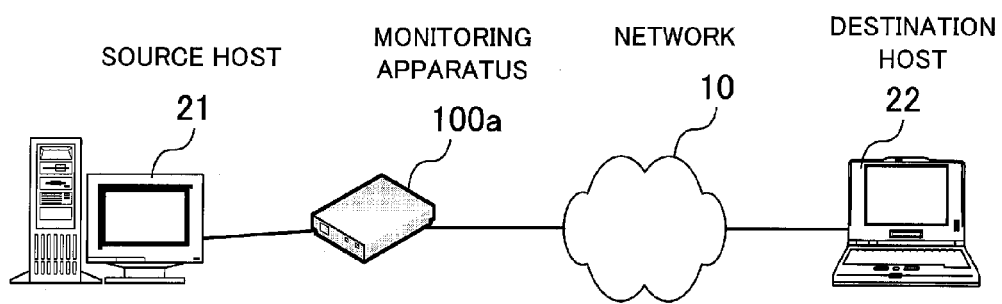
FIG. 16 illustrates an example structure of a system according to a second embodiment.

FIG. 16 illustrates an example structure of a system according to a second embodiment. In the second embodiment a monitoring apparatus 100a is connected between a source host 21 and a network 10. The monitoring apparatus 100a captures a packet exchanged between the source host 21 and a destination host 22, and measures RTT.

Figure 17:
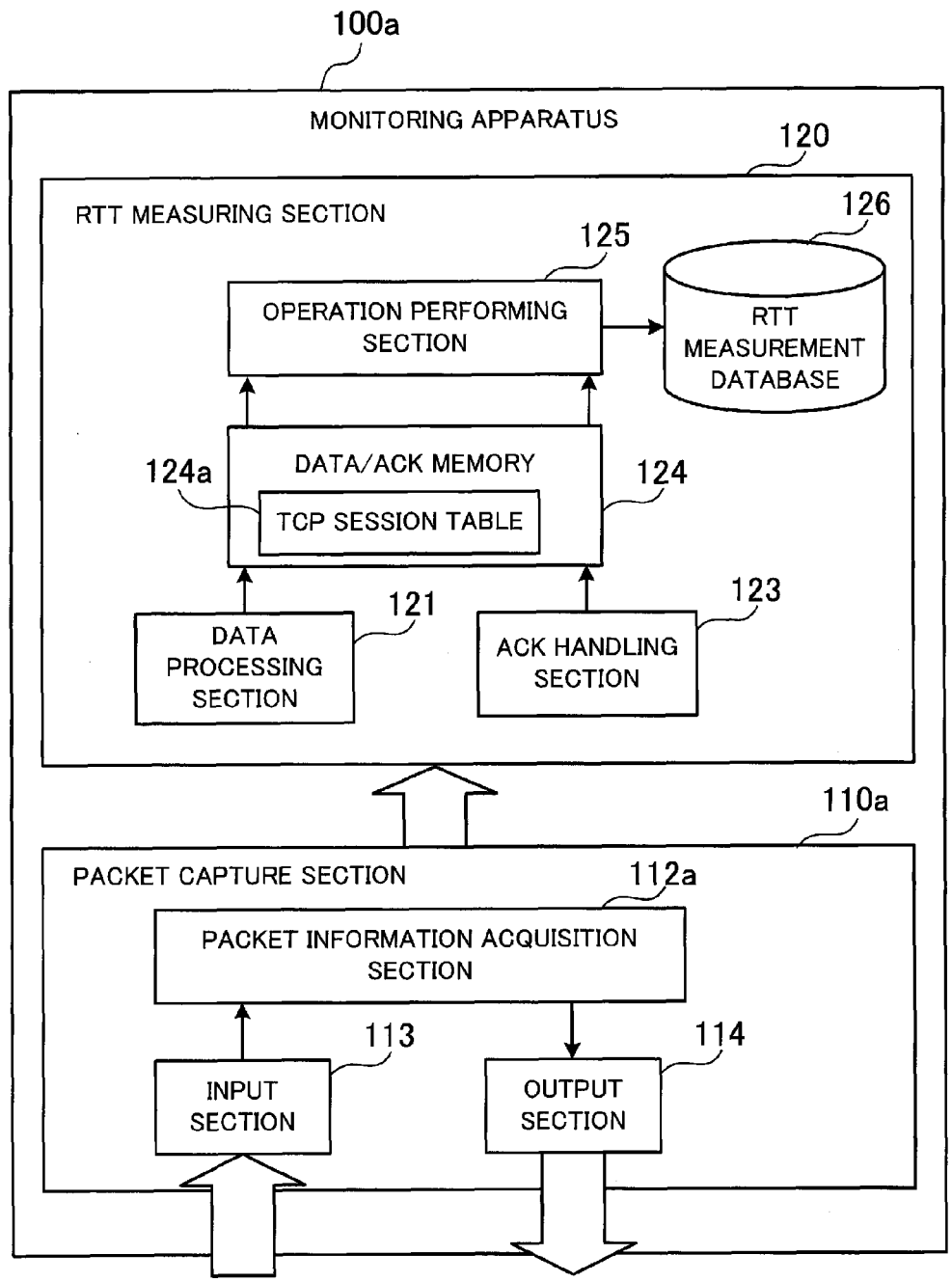
FIG. 17 is a block diagram of the functions of a monitoring apparatus included in the system according to the second embodiment.
Figure 18:
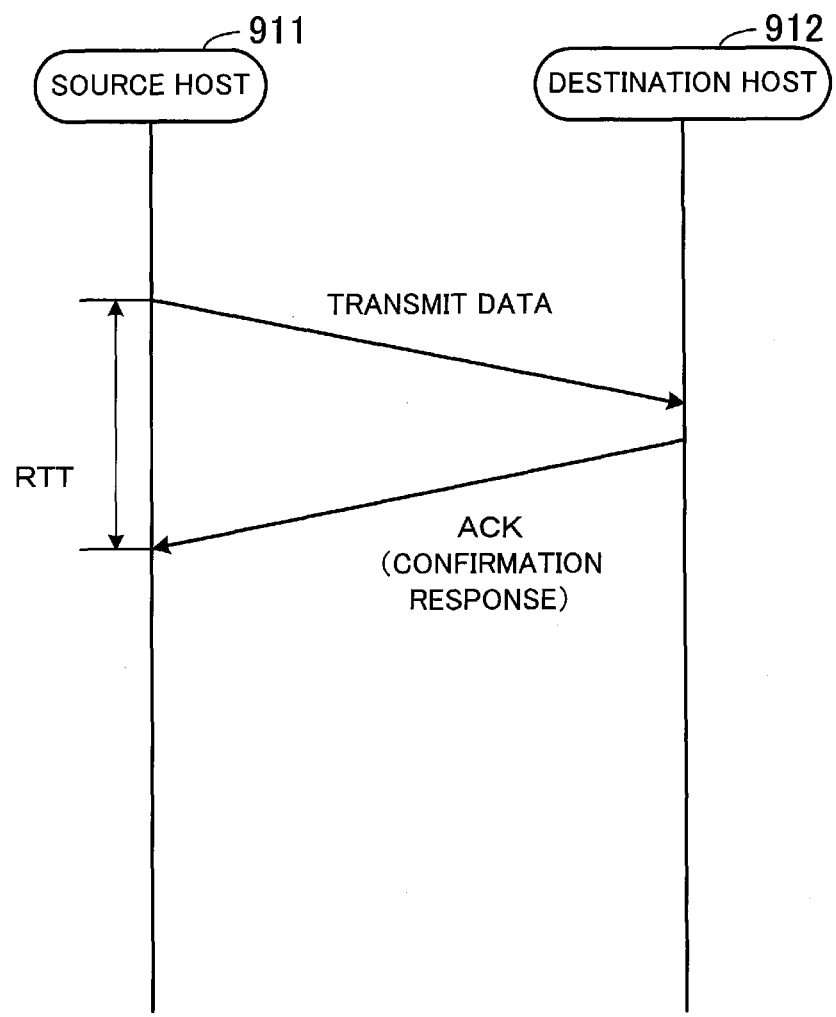
FIG. 18 illustrates an example basic operation of transmitting and receiving a packet on the basis of TCP.

FIG. 17 is a block diagram of the functions of the monitoring apparatus included in the system according to the second embodiment. The functions of the monitoring apparatus 100a included in the system according to the second embodiment are approximately the same as those of the monitoring apparatus 100 of the system according to the first embodiment depicted in FIG. 7. Therefore, functions of the monitoring apparatus 100a in FIG. 17 that are the same as those of the monitoring apparatus 100 depicted in FIG. 7 are marked with the same symbols and descriptions of them will be omitted.

The monitoring apparatus 100a included in the system according to the second embodiment has a packet capture section 110a including an input section 113 and an output section 114. The input section 113 inputs a packet transmitted from the source host 21 or the destination host 22 to a packet information acquisition section 112a. The output section 114 acquires a packet inputted via the packet information acquisition section 112a and transmits the packet to the source host 21 or the destination host 22 according to a destination of the packet.

The packet information acquisition section 112a makes a copy of the packet inputted via the input section 113, and passes the copy to an RTT measuring section 120. Then the packet information acquisition section 112a passes the packet to the output section 114.

By using the above monitoring apparatus 100a, a packet can be captured without a device, such as a network tap, for branching a signal and RTT can be measured.

In the above first or second embodiment a data packet transmitted from the source host 21 to the destination host 22 is captured. However, various pieces of information included in a packet may be recorded once in, for example, a file format in a data recorder instead. In this case, the monitoring apparatus 100 or 100a reads out the various pieces of information included in the packet from the data recorder and measures RTT.

The functions of the monitoring apparatus according to each of the above embodiments can be realized with a computer. In this case, a program in which the contents of the functions the monitoring apparatus has are described is provided. By executing this program on the computer, the above functions are realized on the computer. This program can be recorded on a computer readable record medium. A computer readable record medium can be a magnetic recording device, an optical disk, a magneto-optical recording medium, a semiconductor memory, or the like. A magnetic recording device can be a hard disk drive (HDD), a flexible disk (FD) a magnetic tape, or the like. An optical disk can be a digital versatile disk (DVD), a digital versatile disk random access memory (DVD-RAM), a compact disk read only memory (CD-ROM), a compact disk recordable (CD-R)/rewritable (CD-RW) or the like. A magneto-optical recording medium can be a magneto-optical disk (MO) or the like.

To place the program on the market, portable record media, such as DVDs or CD-ROMs, on which it is recorded are sold. Alternatively, the program is stored in advance on a hard disk in a server computer and is transferred from the server computer to another computer via a network.

When the computer executes this program, it will store the program, which is recorded on a portable record medium or which is transferred from the server computer, on, for example, its hard disk. Then the computer reads out the program from its hard disk and performs processes in compliance with the program. The computer can also read out the program directly from a portable record medium and perform processes in compliance with the program. Furthermore, each time the program is transferred from the server computer, the computer can perform processes in turn in compliance with the program it receives.

With the above delay time measuring apparatus, the above delay time measuring program recorded on a computer readable record medium, and the above delay time measuring method, delay time can be calculated by selecting only ACKs not including a "Delayed ACK".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A delay time measuring apparatus for measuring a delay time from transmission of data to reception of a response to the transmission, the apparatus comprising:
a storage control section, coupled to a storage device, which receives a first data packet, as well as a second data packet subsequent to the first data packet, transmitted from a source unit to a destination unit and stores first and second sequence numbers and first and second data lengths of the received first and second data packets in the storage device, together with records indicating first and second receiving times of the received first and second data packets, and which receives ACK packets returned from the destination unit to the source unit and stores ACK numbers of the received ACK packets in the storage device, together with a record indicating receiving time of each received ACK packet, the first and second lengths being integers which are greater than zero; and
a calculation section which detects an ACK packet whose ACK number is equal to a sum of the second sequence number and second data length of the second data packet, calculates a difference between the ACK number of the detected ACK packet and the ACK number of an ACK packet received immediately before the detected ACK packet, determines that the source unit has transmitted the second data packet without waiting for an ACK packet corresponding to the first data packet when the difference is greater than the second data length of the second data packet, and calculates a delay time based on the second receiving time of the second data packet and the receiving time of the detected ACK packet, the delay time being calculated by eliminating a delayed ACK packet, in order to evaluate the quality of the network by measuring the delay time, the delayed ACK packet being returned from the destination unit to the source unit after a predetermined delay.

2. The delay time measuring apparatus according to claim 1, wherein the calculation section calculates the delay time as a difference between the second receiving time and the receiving time of the detected ACK packet.

3. The delay time measuring apparatus according to claim 1, wherein the calculation section calculates, upon detecting absence of a stored ACK number indicating an ACK packet for the first data packet, a sequence number by adding the first data length of the first data packet to the first sequence number of the first data packet, and finds a data packet having the calculated sequence number to be the second data packet.

4. The delay time measuring apparatus according to claim 1, wherein the storage control section receives the first and second data packets via a first communication path which branches from a second communication path between the source unit and the destination unit.

5. The delay time measuring apparatus according to claim 1, wherein the storage control section is configured to receive information on the first and second data packets from a file or a data recorder.

6. A computer-readable, non-transitory medium storing a delay time measuring program for measuring a delay time from transmission of data to reception of a response to the transmission, the program causing a computer with a memory to execute a procedure, the procedure comprising:
receiving a first data packet, as well as a second data packet subsequent to the first data packet, transmitted from a source unit to a destination unit and storing first and second sequence numbers and first and second data lengths of the received first and second data packets in the memory, together with records indicating first and second receiving times of the received first and second data packet, the first and second lengths being integers which are greater than zero;
receiving ACK packets returned from the destination unit to the source unit and storing ACK numbers of the received ACK packets in the memory, together with a record indicating receiving time of each received ACK packet;
searching the memory to detect an ACK packet whose ACK number is equal to a sum of the second sequence number and second data length of the second data packet;
calculating a difference between the ACK number of the detected ACK packet and the ACK number of an ACK packet received immediately before the detected ACK packet;
determining that the source unit has transmitted the second data packet without waiting for an ACK packet corresponding to the first data packet when the difference is greater than the second data length of the second data packet; and
calculating a delay time based on the second receiving time of the second data packet and the receiving time of the detected ACK packet, the delay time being calculated by eliminating a delayed ACK packet, in order to evaluate the quality of the network by measuring the delay time, the delayed ACK packet being returned from the destination unit to the source unit after a predetermined delay.

7. A delay time measuring method for measuring a delay time from transmission of data to reception of a response to the transmission by the use of a computer with a memory, the method comprising:
receiving a first data packet, as well as a second data packet subsequent to the first data packet, transmitted from a source unit to a destination unit and storing first and second sequence numbers and first and second data lengths of the received first and second data packets in the memory, together with records indicating first and second receiving times of the received first and second data packets, the first and second lengths being integers which are greater than zero;
receiving ACK packets returned from the destination unit to the source unit and storing ACK numbers of the received ACK packets in the memory, together with a record indicating receiving time of each received ACK packet;
searching the memory to detect an ACK packet whose ACK number is equal to a sum of the second sequence number and second data length of the second data packet;
calculating a difference between the ACK number of the detected ACK packet and the ACK number of an ACK packet received immediately before the detected ACK packet;
determining that the source unit has transmitted the second data packet without waiting for an ACK packet corresponding to the first data packet when the difference is greater than the second data length of the second data packet; and
calculating a delay time based on the second receiving time of the second data packet and the receiving time of the detected ACK packet, the delay time being calculated by eliminating a delayed ACK packet, in order to evaluate the quality of the network by measuring the delay time, the delayed ACK packet being returned from the destination unit to the source unit after a predetermined delay.

\* \* \* \* \*